United States Patent
Geraghty

(10) Patent No.: US 8,512,183 B2
(45) Date of Patent: Aug. 20, 2013

(54) BELT DRIVE SYSTEM ASSEMBLY AND TENSION APPARATUS

(75) Inventor: Brendan H. Geraghty, Ballinasloe (IE)

(73) Assignee: Thermo King Corporation, Minneapolis, MN (US)

( * ) Notice: Subject to any disclaimer, the term of this patent is extended or adjusted under 35 U.S.C. 154(b) by 361 days.

(21) Appl. No.: 12/896,234

(22) Filed: Oct. 1, 2010

(65) Prior Publication Data
US 2011/0081999 A1 Apr. 7, 2011

Related U.S. Application Data

(60) Provisional application No. 61/248,400, filed on Oct. 2, 2009.

(51) Int. Cl.
*F16H 7/08* (2006.01)
(52) U.S. Cl.
USPC ........................................... 474/133
(58) Field of Classification Search
USPC .................. 474/101, 113, 115, 117
See application file for complete search history.

(56) References Cited

U.S. PATENT DOCUMENTS

| | | | |
|---|---|---|---|
| 2,048,510 A | 7/1936 | Morrill | |
| 2,508,756 A * | 5/1950 | Jackoboice | 290/1 R |
| 2,970,587 A | 2/1961 | Estes | |
| 3,018,667 A | 1/1962 | Spietz | |
| 3,041,023 A | 6/1962 | Odlum et al. | |
| 3,057,218 A | 10/1962 | Knerr et al. | |
| 3,430,507 A | 3/1969 | Hurst et al. | |
| 3,922,927 A | 12/1975 | Shiki et al. | |
| 4,023,428 A | 5/1977 | Dysard | |
| 4,362,062 A | 12/1982 | Peterson | |
| 4,489,475 A | 12/1984 | Struttmann et al. | |
| 4,512,752 A | 4/1985 | Brenneman | |
| 4,571,221 A | 2/1986 | Isobe et al. | |
| 4,618,335 A | 10/1986 | Brandenstein et al. | |
| 4,633,828 A | 1/1987 | Steele | |
| 4,767,383 A | 8/1988 | St. John | |
| 4,887,992 A | 12/1989 | Dixon | |
| 4,957,471 A | 9/1990 | St. John | |
| 5,064,405 A | 11/1991 | St. John | |
| 5,705,870 A | 1/1998 | Thomsen et al. | |
| 5,938,169 A | 8/1999 | Ogawa et al. | |
| 6,240,893 B1 | 6/2001 | Hankins et al. | |
| 6,324,744 B1 | 12/2001 | Banks et al. | |
| 6,360,712 B1 | 3/2002 | Banks et al. | |

(Continued)

*Primary Examiner* — William E Dondero
*Assistant Examiner* — Diem Tran
(74) *Attorney, Agent, or Firm* — Michael Best & Friedrich LLP

(57) ABSTRACT

A belt assembly and adjustment mechanism for a belt drive system including a belt. The belt assembly and adjustment mechanism includes a first bracket that is attachable to a first portion of the belt drive system, and a second bracket that is attachable to a second portion of the belt drive system. The second portion is different from the first portion. The mechanism also includes a belt drive system component that is positioned between the first bracket and the second bracket. The component is pivotally coupled to the first bracket on one side of the component and is pivotally coupled to the second bracket on another side of the component. The component is further slidably coupled to one of the first bracket and the second bracket such that the component is movable between a first orientation at which the belt is configured to be tensioned and a second orientation at which the belt is configured to be installed on the component.

19 Claims, 4 Drawing Sheets

(56) References Cited

U.S. PATENT DOCUMENTS 6,575,858 B2 6/2003 Green et al.
2006/0105871 A1 5/2006 Stone
2008/0176687 A1 7/2008 Schever
2009/0111630 A1 4/2009 Kume

* cited by examiner

BELT DRIVE SYSTEM ASSEMBLY AND TENSION APPARATUS

The present patent application claims the benefit of U.S. Provisional Patent Application No. 61/248,400 filed Oct. 2, 2009, the entire content of which is herein incorporated by reference.

BACKGROUND

The present invention relates to a belt drive system, and more particularly, the present invention relates to a belt drive system including a pulley assembly and tension apparatus.

Many existing vehicles (e.g., automobiles, tractors, straight trucks, tractor-trailer combinations, etc.) include power transmission belt drive systems to transfer power from an engine or motor to one or more auxiliary or accessory components. For example, in vehicular applications, these accessories can include power steering pumps, water pumps, air conditioning compressors, fuel pumps, and alternators. Generally, each accessory includes a pulley that is coupled to pulleys of other accessories via one or more belts. Belt drive systems can be used in conjunction with the primary engine or motor of a vehicle to transfer power via pulleys and belts to one or more accessories, or these systems can be used in conjunction with auxiliary systems (e.g., refrigeration systems for transport refrigeration units, etc.) to transfer power.

In most belt drive systems, one or more components are movable such that the belt can be assembled onto or trained around the pulleys. In some vehicles, the belt drive system is located in a relatively small compartment, and as a result, the components of the belt drive system are positioned relatively close to each other. Often, no tension can be placed on the belt when the belt is trained onto the pulleys due to the confined space in which the belt drive system is located. In some existing belt drive systems, the belt must be rotated about a point to fit the belt onto the pulleys. In other existing belt drive systems, the belt is slid in a slot. However, these belts often have inadequate tension upon assembly onto the pulleys and other components of the belt drive system interfere with the belt during assembly, which makes the process time consuming and difficult.

In many belt drive systems that include an alternator, the alternator is mounted in a slot for linear movement, or is pivoted on one end so that the alternator can move in an arc having a radius that is the same as the alternator length. In these systems, the alternator has one degree of motion (i.e., either sliding movement or rotational movement), and the belt is trained around the pulleys of other components in the belt drive system before being trained onto the alternator pulley. Often, the belt has at least some tension prior to assembly onto the alternator pulley, making the process of training the belt onto the pulleys somewhat difficult. After the belt has been trained onto all of the pulleys, the alternator is moved linearly or pivoted to extend or tighten the belt. Other systems move the engine or motor, or another component of the system, to attach the belt to the pulleys. Many of these systems use bolts to pull or push the belt with different components. However, in relatively small compartments, simply moving or pivoting one or more components interferes with other components (e.g., a compressor, a fan pulley, etc.) in the system.

Typically, the belt must be tightened or tensioned after the belt is trained onto or connected to the pulleys so that power can be efficiently transferred among the accessories. In order for the belt drive system to function, the belt must be maintained at a predetermined tension to avoid shortening the life of the belt or the components of the system. Some belt drive systems include an automatic tensioner device that presses on the belt, which acts to lengthen the distance about which the belt is trained and thereby causes the belt to be extended or in tension. Various techniques and geometries have been employed to provide the biasing force. However, for belt drive systems in relatively small compartments, there is no room for an automatic tensioner device.

Some belt drive systems use stretch belts that typically do not require movable pulleys, and when stretched properly, will maintain tension for a given period. However, these belts generally cannot be fully stretched upon initial assembly onto the pulleys because the high belt tension needed causes too much bearing stress on the belt. Similarly, too little tension or stretching of the belt results in the belt being too loose to adequately transfer power between the components of the belt drive system.

Typically, adjusting and measuring the tension on a belt is difficult due to very little room for accessing the belt within the compartment. In existing belt drive systems, the process of adjusting and measuring the tension is often repeated several times to achieve a desired result. Also, special, often costly tools are often required to adequately measure the belt tension. However, these tools often provide inconsistent readings and when combined with existing belt drive systems, can significantly increase the time needed to assemble the belt onto the pulleys.

SUMMARY

The invention provides a belt assembly and adjustment mechanism for a belt drive system that simplifies belt installation and adjustment in a confined space. The belt assembly and adjustment mechanism allows a belt to be installed on the belt drive system without tension the belt during installation, simplifying the assembly process. The belt assembly and adjustment mechanism increases the distance that the alternator can be adjusted to assemble and adjust the belt without necessitating a larger housing and without interfering with other components in the confined space. The belt assembly and adjustment mechanism includes a movable alternator that has two degrees of freedom for cooperatively sliding and rotating the alternator between first and second orientations so that the belt can be installed on the belt drive system and so that adequate tension can be placed on the belt.

The invention also provides a tension apparatus for a belt drive system that maintains sufficient tension on the belt for a desired belt life without overly tensioning the belt. The tension apparatus includes perceptible indicators that identify the proper position of a movable component of the belt drive system relative to a desired fitted belt length to provide belt tension adjustment capability without special tools.

The invention further provides a belt assembly and adjustment mechanism and tension apparatus for a belt drive system that simplifies belt installation and adjustment in a confined space and that adequately tensions the belt based on desired belt tension characteristics. The belt assembly and adjustment mechanism includes brackets that cooperate with a component associated with the belt drive system to provide two degrees of freedom for the component such that the component can move a relatively large distance between first and second orientations in the confined space without interfering with other components in the confined space. The tension apparatus maintains sufficient tension on the belt for a desired belt life, and includes perceptible indicators that identify the proper position of a movable component of the belt drive system relative to a desired fitted belt length to provide belt tension adjustment capability without special tools.

In one construction, the invention provides a belt assembly and adjustment mechanism for a belt drive system including a belt. The belt assembly and adjustment mechanism includes a first bracket that is attachable to a first portion of the belt drive system, and a second bracket that is attachable to a second portion of the belt drive system. The second portion is different from the first portion. The mechanism also includes a belt drive system component that is positioned between the first bracket and the second bracket. The component is pivotally coupled to the first bracket on one side of the component and is pivotally coupled to the second bracket on another side of the component. The component is further slidably coupled to one of the first bracket and the second bracket such that the component is movable between a first orientation at which the belt is configured to be tensioned and a second orientation at which the belt is configured to be installed onto the component.

In another construction, the invention provides a belt assembly and adjustment mechanism for a belt drive system including a belt. The belt assembly and adjustment mechanism includes a first bracket that is attachable to a portion of the belt drive system and that includes a first slot, and a second bracket that is attachable to a portion of the belt drive system and that defines a sliding attachment portion that has a second slot. The mechanism also includes a link pivotally coupled to the first bracket within the first slot, and a belt drive system component pivotally coupled to the link such that the component is guidable through a rotating trajectory via pivotal movement of the link within the first slot. The component is coupled to the second bracket within the second slot such that the component is slidable along a linear trajectory within the second slot. The rotating trajectory and the linear trajectory facilitate movement of the component between a first orientation and a second orientation.

In another construction, the invention provides a belt assembly and adjustment mechanism for a belt drive system including a belt. The belt assembly and adjustment mechanism includes a first bracket that is attachable to a first portion of the belt drive system, a second bracket that is attachable to a second portion of the belt drive system different from the first portion, and a belt drive system component. The belt drive system component is positioned between the first bracket and the second bracket such that the first bracket and the second bracket are on substantially opposite sides of the component. The component includes a first pivot located adjacent the first bracket and a second pivot located adjacent the second bracket. The component is further slidably coupled to one of the first bracket and the second bracket such that the component has a rotating trajectory and a sliding trajectory between a first orientation and a second orientation. A plane extending through the first pivot and the second pivot is disposed at a first angle relative to a horizontal plane extending through a center of the component when the component is in the first orientation. The plane is disposed at a second angle larger than the first angle relative to the horizontal plane when the component is in the second orientation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
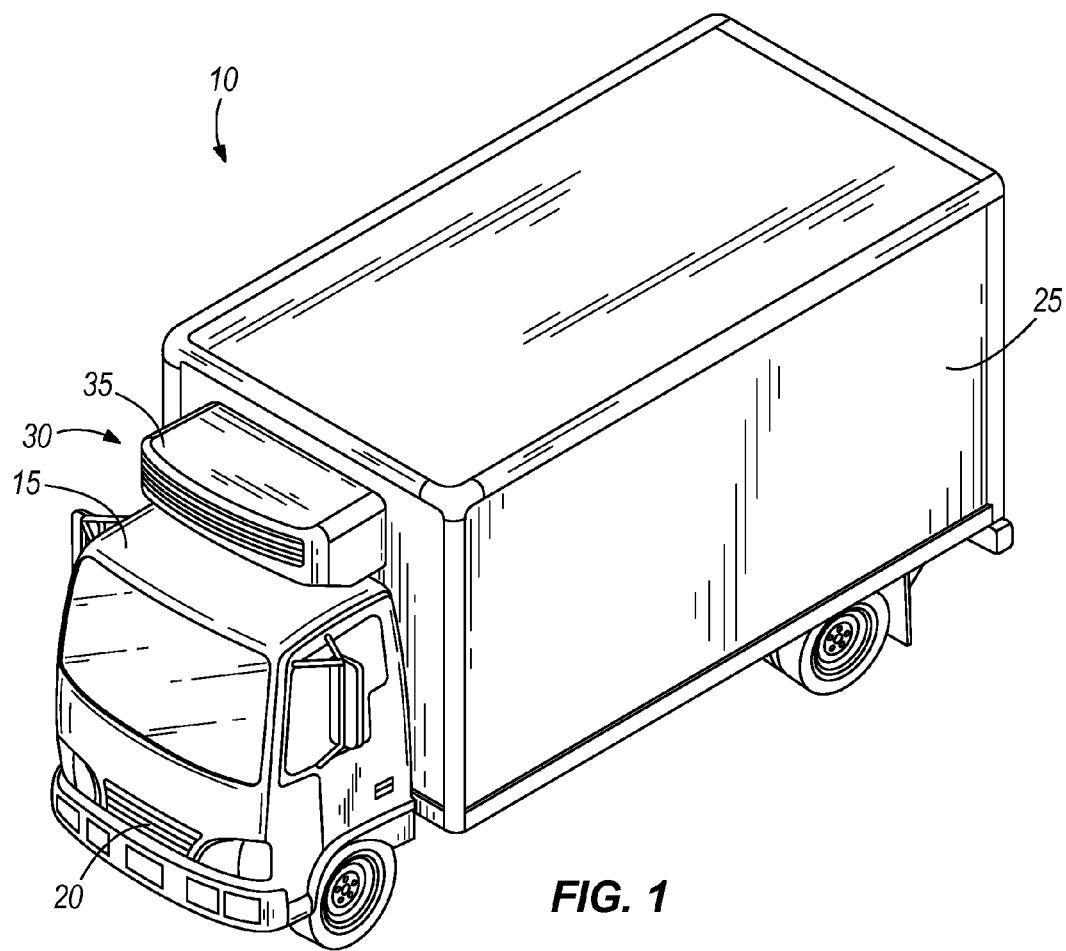
FIG. 1 is a perspective view of a vehicle including a transport refrigeration unit embodying the present invention.

FIG. 1 shows an exemplary vehicle 10 embodying the invention. In other constructions, the vehicle 10 can be an automobile, a tractor-trailer combination, or other vehicles. The vehicle 10 illustrated in FIG. 1 includes a cabin 15, an engine compartment 20 that has a primary engine or motor assembly (not shown), a transport compartment 25 that defines a load space and that is used to transport cargo, and a temperature control system 30 that is coupled to the transport compartment 25. The temperature control system 30 includes a housing 35 that is attached to a forward end of the transport compartment 25 substantially above the cabin 15. In other constructions, the temperature control system 30 may be located elsewhere on the vehicle 10.

Figure 2:
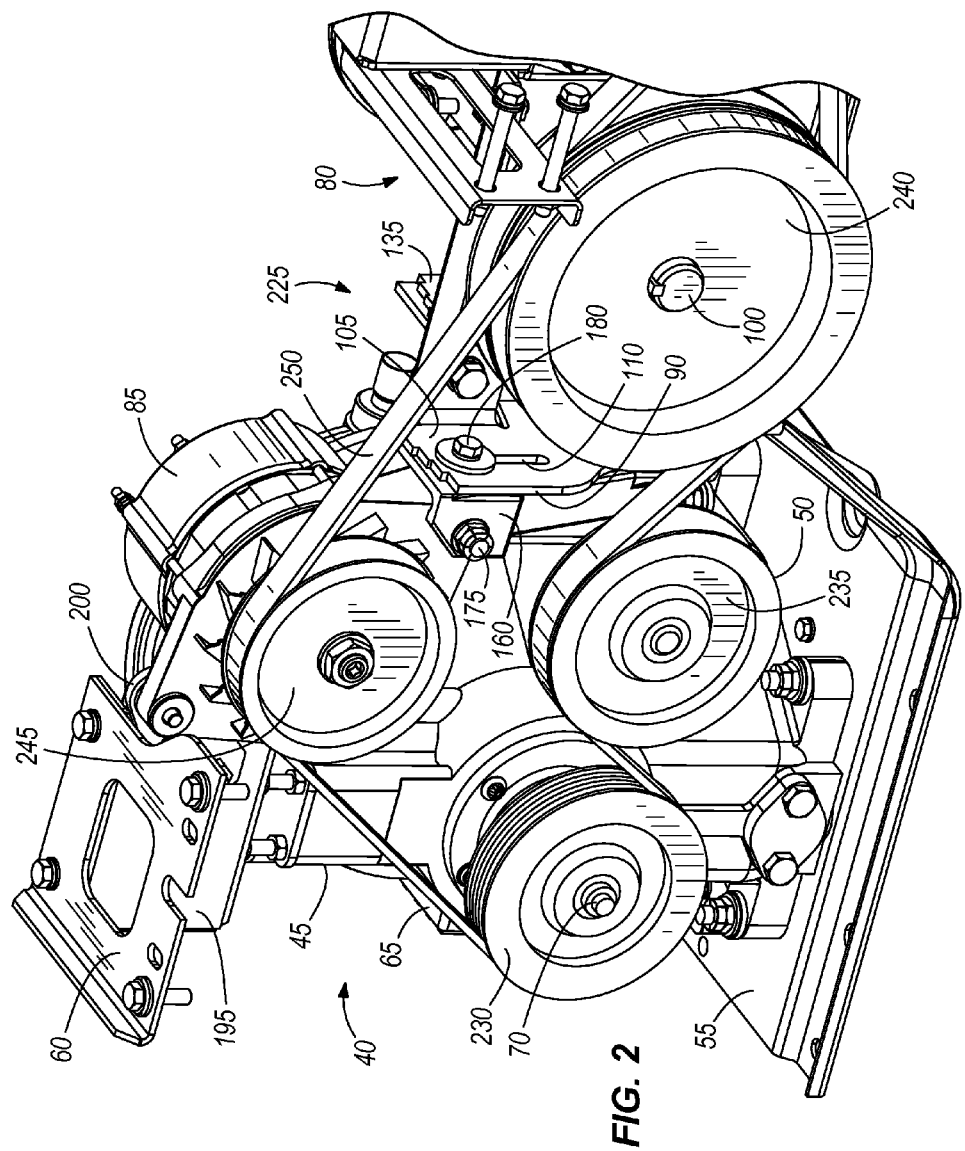
FIG. 2 is a perspective view of a portion of a belt drive system of the transport refrigeration unit of FIG. 1.
Figure 3:
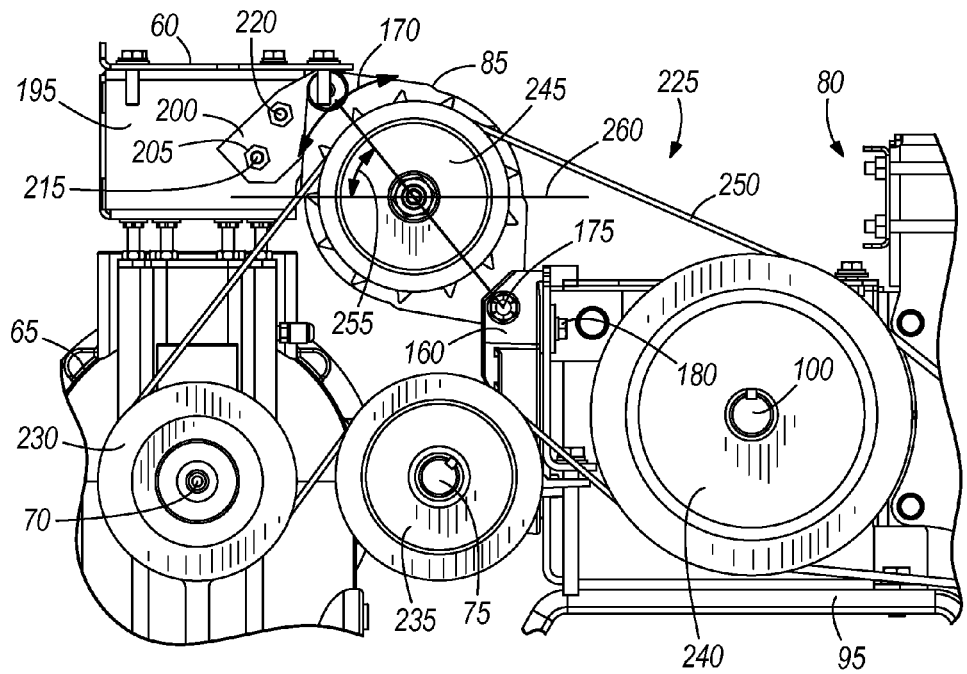
FIG. 3 is a front view of the belt drive system of FIG. 2 including an alternator in a first position.
Figure 4:
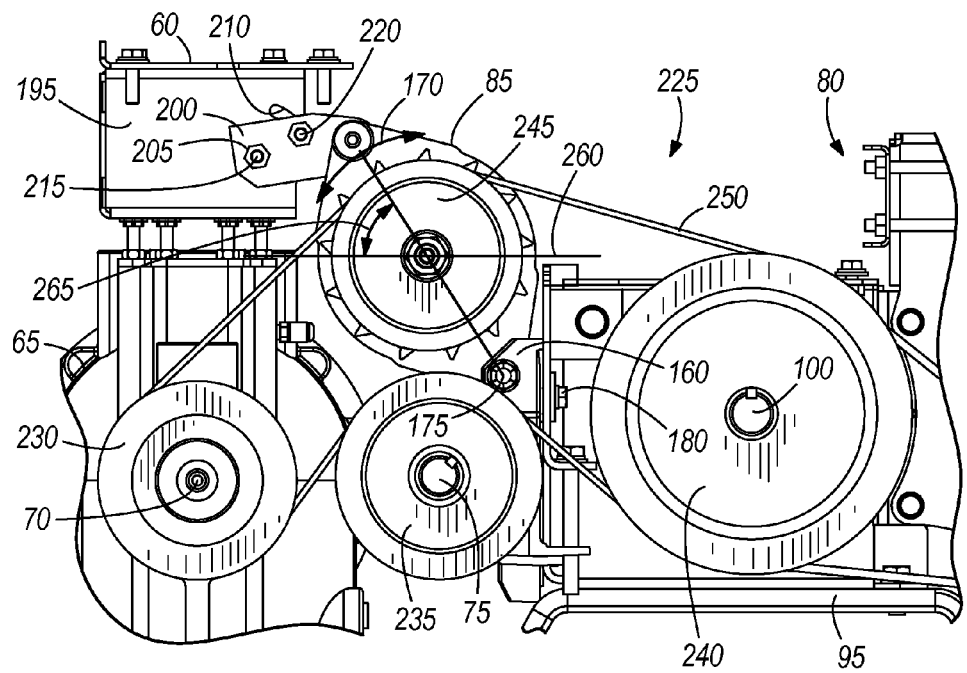
FIG. 4 is another front view of the belt drive system of FIG. 2 including the alternator in a second position.

FIGS. 2-4 show a portion of the temperature control system 30 that includes a refrigeration unit 40 for conditioning the load space. The refrigeration unit 40 includes a compressor assembly 45 and an evaporator fan assembly 50 (partially shown) that are in communication with other components of the refrigeration unit 40 (e.g., evaporator, condenser, etc.). The compressor assembly 45 is coupled to the housing 35 by a lower support bracket 55 and an upper support bracket 60, and includes a compressor 65 and a drive shaft 70 that is operatively coupled to the compressor 65. The lower and upper support brackets 55, 60 stabilize the compressor assembly 45 within the housing 35. The evaporator fan assembly 50 is located adjacent the compressor assembly 45 and includes an evaporator fan (not shown) and a drive shaft 75 that is operatively coupled to the evaporator fan.

Figure 5:
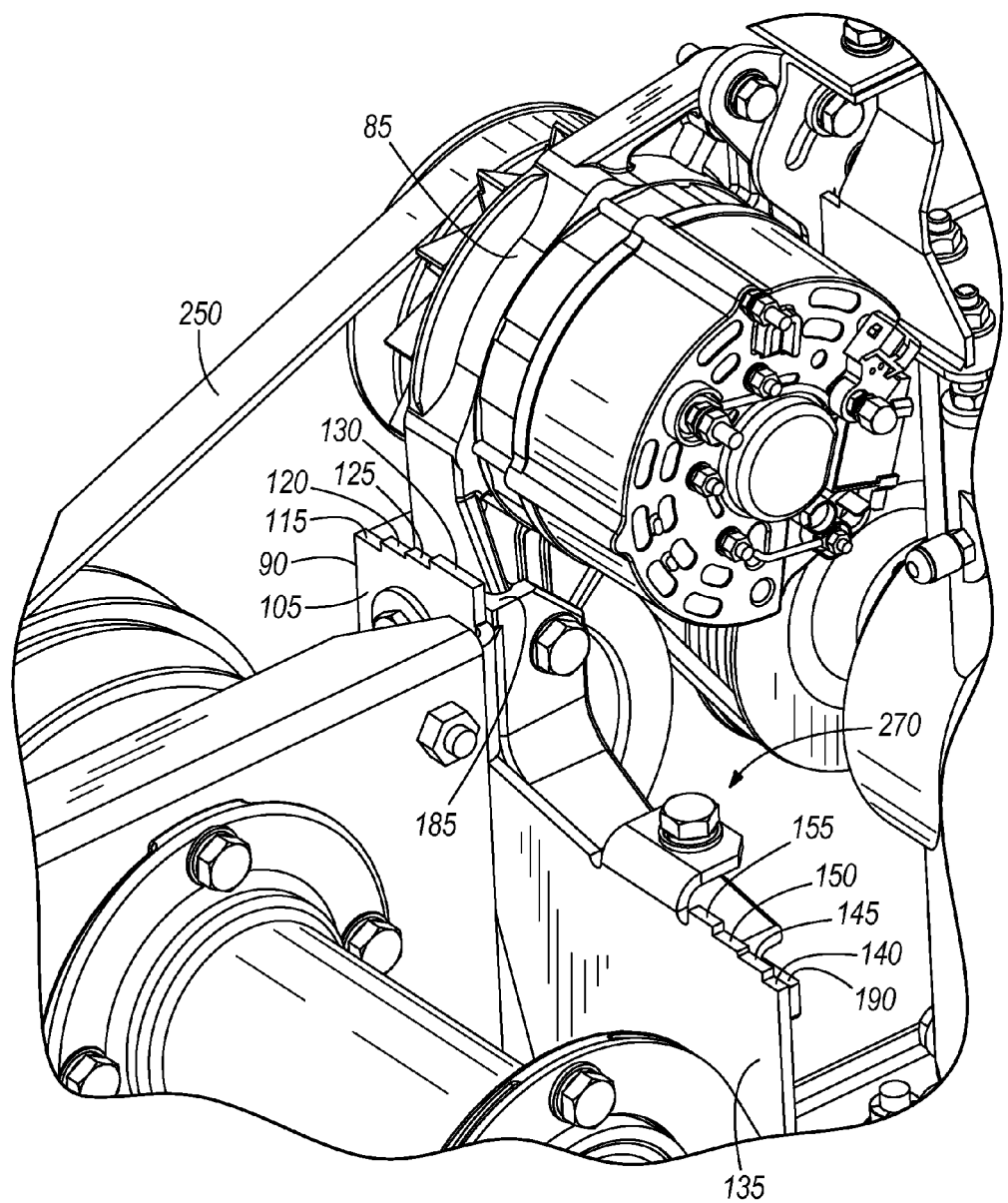
FIG. 5 is a perspective view of a portion of the belt drive system including a belt tension control apparatus.

The temperature control system 30 also includes a motor or engine assembly 80 (hereinafter "motor assembly") and an alternator 85. The motor assembly 80 includes a motor bracket 90, a prime mover (e.g., motor, engine, etc.) that is coupled to the motor bracket 90 and that is further coupled to the housing 35 by brackets 95, and a drive shaft 100 that is operatively engaged with the prime mover (not shown). As shown in FIGS. 2 and 5, the motor bracket 90 includes a first portion 105 that defines an elongated slot 110 and that includes a first step 115, a second step 120, a third step 125, and a fourth step 130. As shown in FIG. 5, the motor bracket 90 also includes a second portion 135 that includes a first step 140, a second step 145, a third step 150, and a fourth step 155. The two sets of steps 115, 120, 125, 130, 140, 145, 150, 155 are generally oriented in a stair-like pattern from each of the first steps 115, 140 to the associated fourth steps 130, 155, although other patterns of steps are possible and considered herein.

The alternator 85 is positioned between the compressor assembly 45 and the motor assembly 80 and vertically above the evaporator fan assembly 50, and is movable relative to the compressor assembly 45, the evaporator fan assembly 50, and the motor assembly 80. The alternator 85 is further positioned in the housing 35 such that the alternator 85 is located below the top of the housing 35. The alternator 85 is coupled to the motor bracket 90 via a first alternator bracket 160, and includes a drive shaft 165. As indicated by arrow 170, the alternator 85 is pivotable in two directions relative to the first alternator bracket 160 via a pivot element 175 (e.g., a fastener) that is coupled to the first alternator bracket 160. The first alternator bracket 160 is in turn coupled to the motor bracket 90 via a fastener 180 (e.g., a bolt) extending through the elongated slot 110 such that the first alternator bracket 160 is slidingly movable within the elongated slot 110 (vertically movable as viewed in FIGS. 3 and 4). As shown in FIG. 5, the first alternator bracket 160 defines a first surface 185 adjacent a first end of the first alternator bracket 160, and a second surface 190 adjacent a second end of the first alternator bracket 160.

The alternator 85 is coupled to the upper support bracket 60 via a second alternator bracket 195 and a link 200 coupled between the alternator 85 and the second alternator bracket 195. The second alternator bracket 195 defines a pivot hole 205 and a pivot slot 210, and is attached to the upper support bracket 60. The second alternator bracket 195 cooperates with the first alternator bracket 160 to support the alternator 85 within the housing 35.

The link 200 is defined by an elongated body that has a predetermined length. The link 200 has two holes for receiving a first link element or fastener 215 and a second link element or fastener 220. The first link element 215 pivotably attaches the link 200 to the second alternator bracket 195 within the pivot hole 205 such that the link 200 is pivotable about an axis defined by the pivot hole 205. The second link element 220 is engaged with the second alternator bracket 195 within the pivot slot 210 such that the link 200 is pivotable along an arc defined by the pivot slot 210.

The compressor assembly 45 and the evaporator fan assembly 50 are operatively coupled to the motor assembly 80 and the alternator 85 via a belt drive system 225. The belt drive system 225 includes a compressor pulley 230 that is attached to the drive shaft 70 of the compressor assembly 45, a fan pulley 235 that is attached to the drive shaft 75 of the evaporator fan assembly 50, a motor pulley 240 that is attached to the drive shaft 100 of the motor assembly 80, and an alternator pulley 245 that is attached to the drive shaft 165 of the alternator 85.

The belt drive system 225 also includes a belt 250 that extends over or is trained onto the pulleys 230, 235, 240, 245 to drivingly engage each of the compressor assembly 45, the evaporator fan assembly 50, the motor assembly 80, and the alternator 85. In some constructions, the belt 250 can be a stretch belt that stretches more than a standard belt. In other constructions, the belt 250 can be a standard belt.

The alternator 85 is movable to assist with assembly of the belt 250 onto the pulleys 230, 235, 240, 245 in the relatively confined space defined by the housing 35. In other constructions, other components of the temperature control system 30 can move instead of or in addition to the alternator 85 to assist with assembling the belt 250 onto the pulleys 230, 235, 240, 245. Generally, the alternator 85 (or other components in constructions in which other components are movable to facilitate installation and adjustment of the belt 250), the motor bracket 90, the first and second alternator brackets 160, 195, the link 200, the pivot element 175, the fastener, and the first and second link elements 215, 220 cooperatively define a belt assembly and adjustment mechanism that allows the belt 250 to be assembled onto the pulleys 230, 235, 240, 245 without tension on the belt 250.

Movement of the alternator 85 allows adjustment of the tension on the belt 250 and replacement of the belt 250 in a confined space. FIG. 3 shows the temperature control system 30 and the belt drive system 225 in a first orientation corresponding to an operating state of the temperature control system 30. In the first orientation, the belt 250 is adequately tensioned to transfer rotation of the motor pulley 240 to the compressor assembly 45, the fan assembly 50, and the alternator 85. As shown in FIG. 3, the link 200 is pivoted to a tensioned position corresponding to an uppermost limit of the pivot slot 210, and the first alternator bracket 160 is positioned in a tensioned position corresponding to the uppermost limit of the elongated slot 110 such that the alternator 85 is below the uppermost portion of the housing 35 and is oriented at a first angle 255 relative to a horizontal plane 260 through the drive shaft 165 of the alternator 85. This orientation of the alternator 85 avoids interference with other components of the temperature control system 30 and maximizes belt adjustment capability within the housing 35.

FIG. 4 shows the temperature control system 30 and the belt drive system 225 in a second orientation corresponding to a non-operating state of the temperature control system 30. In the second orientation, the alternator 85 is in a belt assembly position such that the belt 250 can removed and replaced with another belt without initial tension on the replacement belt. The link 200 pivots about the pivot hole 205 and within the pivot slot 210, and cooperates with the second alternator bracket 195 to rotate or pivot the alternator 85 about the pivot element 175. The first alternator bracket 160 cooperates with the motor bracket 90 to slidingly move the alternator 85 generally downward toward the evaporator fan assembly 50 such that the alternator 85 defines a second angle 265 that is larger than the first angle 255 relative to the horizontal plane 260 when the alternator 85 is in the second orientation. The combined rotational and guided sliding trajectory of the alternator 85 defines two degrees of freedom (two directions of motion) for the alternator 85, which effectively maximizes the amount that the alternator 85 and the alternator pulley 245 can move within the available space and provides sufficient belt adjustment for the belt 250. The two degrees of freedom also provide additional distance for the alternator 85 to move within the confined space, which allows more belt adjustment capability over conventional systems that include an alternator with one degree of freedom.

After the belt 250 is assembled onto the pulleys 230, 235, 240, 245, the alternator 85 is moved back to the first orientation by sliding the second alternator bracket 195 generally upward relative to the motor bracket 90 within the elongated slot 110, and rotating the link 200 within the pivot slot 210. The fastener 180 and the first and second link elements 215, 220 are tightened to maintain the position of the alternator 85 in the first orientation. Movement of the alternator 85 back to the first orientation tensions the belt 250 on the pulleys 230, 235, 240, 245 so that movement of the motor pulley 240 effectively transfers to the remaining pulleys 230, 235, 245.

FIG. 5 shows one construction of a tension apparatus 270 that can be used to properly tension the belt 250. Although the tension apparatus 270 is described with regard to the belt drive system 225, it should be recognized that the tension apparatus 270 can be used with other belt drive systems that utilize other means for assembling the belt 250 onto the associated pulleys 230, 235, 240, 245, and should not be limited to use with the belt drive system 225 described herein.

The alternator 85 is moved generally upward to tension the belt 250. As illustrated in FIG. 5, the tension apparatus 270 utilizes the first alternator bracket 160 and the motor bracket 90 to properly tension the belt 250 by aligning the first and second surfaces 185, 190 of the first alternator bracket 160 with one of the pairs of first, second, third, and fourth steps 115, 120, 125, 130, 140, 145, 150, 155 of the motor bracket 90. By aligning the first and second surfaces 185, 190 with one of pairs of the steps 115, 120, 125, 130, 140, 145, 150, 155, the tension apparatus 270 sets the position of the alternator pulley 245 to control the tension. The alternator pulley 245 is fixed in the aligned position while the belt drive system 225 is operational such that the tension of the belt 250 is substantially constant during operation. By indicating the height of the alternator 85 necessary for proper tension using the steps 115, 120, 125, 130, 140, 145, 150, 155, the alternator pulley 245 is properly oriented and aligned with the other pulleys 230, 235, 240.

Generally, the tension apparatus 270 controls the fitted belt length (i.e., the length of the belt 250 when the belt 250 is fitted onto the pulleys 230, 235, 240, 245) instead of pulley positions to maintain proper tension on the belt 250. In the illustrated construction, the first and second steps 115, 120, 140, 145 generally correspond to proper alignment positions for a belt (e.g., the belt 250) used with single temperature control systems. The third and fourth steps 125, 130, 150, 155 illustrated in FIG. 5 generally correspond to a multiple temperature control system 30s. In other constructions, any combination of the steps 115, 120, 125, 130, 140, 145, 150, 155 and any quantity of steps may be implemented to control the fitted belt length based on the desired belt tension characteristics. Furthermore, the steps 115, 120, 125, 130, 140, 145, 150, 155 may be staggered (e.g., the third steps 125, 145 may be lower than one or both of the first steps 115, 140 and the second steps 120, 145).

The first steps 115, 140 identify the corresponding vertical height of the alternator 85 for a first predetermined belt tension value (i.e., a first or initial fitted belt length), and cooperatively keep the alternator pulley 245 parallel to the other pulleys 230, 235, 240. Similarly, the second, third, and fourth steps 120, 125, 130, 145, 150, 155 identify corresponding vertical heights of the alternator 85 for respective second, third, and fourth predetermined belt tension values (i.e., respective first, second, third, and fourth fitted belt lengths), and cooperatively keep the alternator pulley 245 parallel to the other pulleys 230, 235, 240. Generally, the fastener 180 and the first and second link elements 215, 220 are tightened to fix the height of the alternator 85 and the belt tension at the associated predetermined belt tension value after the first and second surfaces 185, 190 are aligned with the corresponding steps 115, 120, 125, 130, 140, 145, 150, 155.

In constructions of the belt drive system 225 in which the belt 250 is a stretch belt, the tension apparatus 270 may need to be adjusted a second time to fully stretch the belt 250 to the desired fitted belt length without causing too much bearing stress on the belt 250 by fully stretching the belt 250 upon initial assembly onto the pulleys 230, 235, 240, 245. In constructions where a second adjustment is necessary, an operator can loosen the fastener 180 and the first and second link elements 215, 220 to align the first and second surfaces 185, 190 of the first alternator bracket 160 with the next steps (e.g., the second steps 120, 145) associated with the desired fitted belt length. For example, after the first alternator bracket 160 has been aligned with the first steps 115, 140 for a period of time (e.g., at a scheduled or unscheduled service interval), the first alternator bracket 160 can be adjusted such that the first and second surfaces 185, 190 are aligned with the second steps 120, 145. The first and second surfaces 185, 190 can be selectively aligned with the third and fourth steps 125, 130, 150, 155 in a similar manner based on the desired fitted belt length. When the belt 250 is replaced with another belt, the alternator 85 is lowered so that the belt 250 can be removed from the pulleys 230, 235, 240, 245 and the new belt (not shown) can be installed on the pulleys 230, 235, 240, 245. The alternator 85 is then moved so that the first and second surfaces 185, 190 align with the steps (e.g., one of the pairs of steps 115, 120, 125, 130, 140, 145, 150, 155) indicative of the desired fitted belt length.

By incorporating multiple steps onto the motor bracket 90, the motor bracket 90 can be used with different belt drive systems. In constructions of the belt drive system 225 in which more than two fitted belt lengths are desired or needed, an equal number of steps can be provided on the motor bracket 90. In constructions of the belt drive system 225 in which only one fitted belt length is desired or needed, the motor bracket 90 may only one need one pair of steps (e.g., the first steps 115, 140). Alternatively, the upper end of the elongated slot 110 or the upper end of the pivot slot 210 may be used to indicate the predetermined fitted belt length.

The tension apparatus 270 controls the position of the alternator 85 and the alternator pulley 245 to accurately obtain proper belt tension rather than necessitating measuring the tension of the belt 250. In this manner, the tension apparatus 270 obtains the proper belt tension without repeated measurements and without investing substantial time replacing or adjusting tension on the belt 250. In the illustrated construction, the steps 115, 120, 125, 130, 140, 145, 150, 155 are fixed relative to movement of the alternator 85 and the alternator pulley 245, which avoids guesswork associated with determining the correct position of the alternator 85 and the alternator pulley 245 relative to the desired belt tension. The tension apparatus 270 also provides perceptible indicators (e.g., via sight and feel) via the steps 115, 120, 125, 130, 140, 145, 150, 155 and the surfaces 185, 190 that allow an operator to quickly and accurately determine whether the alternator 85 is in the proper position.

In some constructions, the tension apparatus 270 may include a stop (e.g., fastener) that can be positioned in one or both of the elongated slot 110 and the pivot slot 210 to accommodate a desired fitted belt length to inhibit movement of one or both of the fastener 180 and the second link element 220, and thereby inhibit further movement of the alternator 85 beyond the desired position. In other constructions, a pin and hole combination may be used to act as a stop for one or both of the fastener and the second link element 220. The stop and the pin and hole combination can provide perceptible indicators for the operator regarding the position of the alternator 85 and the alternator pulley 245.

In still other constructions, marks may be provided on one or both of the motor bracket 90 and the first alternator bracket 160 to indicate a specific position or angle of the alternator 85, and therefore the position or angle of the alternator pulley 245. Alternatively, in constructions including support brackets (not shown) that may interfere with visual inspection of the tension apparatus 270, large holes may be provided in the support brackets so that an operator can feel whether the first alternator bracket 160 is aligned with the motor bracket 90.

The belt assembly and adjustment mechanism simplifies belt installation and adjustment in the confined space of the housing 35, and maximizes the distance that the alternator 85 can be adjusted to assemble and adjust the belt 250 without necessitating a larger housing and without interfering with the compressor assembly 45, the evaporator fan assembly 50, and the motor bracket 90. In particular, the belt assembly and adjustment mechanism allows the alternator pulley 245 to move up higher within the housing 35 without going over the top of the other components in the housing 35 and provides the amount of stretch needed in the belt 250 for a proper fit in the belt drive system 225.

The tension apparatus 270 maintains sufficient tension on the belt 250 for a desired belt life without overly tensioning the belt 250. The tension apparatus 270 also streamlines the installation and adjustment process by providing perceptible indicators that demarcate the proper position of the alternator 85 and the alternator pulley 245 relative to the desired fitted belt length. The tension apparatus 270 accurately and effectively controls tension on the belt 250 by setting the fitted belt length on the fixed pulley belt drive system 225. The tension apparatus 270 reduces assembly time and is pre-built into components of the temperature control system 30. The tension apparatus 270 extends the life of the belt 250 by providing a consistent belt tension setting based on the fitted belt length without time consuming measurements of the belt tension and without special tools.

When stretched by the tension apparatus 270, the belt 250 will maintain tension for a given period. The tension apparatus 270 avoids issues that are common with existing tension devices, including providing the proper tension on the belt 250 without providing too much tension or too little tension on the belt 250.

The motor bracket 90, the first and second alternator brackets 160, 195, and the link 200 are universal parts that can be used in different assemblies without modification. Although the belt assembly and adjustment mechanism and the tension apparatus 270 are described in detail with regard to the temperature control system 30, the belt assembly and adjustment mechanism and the tension apparatus 270 can be used separately or in combination in various other applications that include a belt drive system 225 (e.g., a primary engine or motor, an auxiliary prime mover assembly, etc.). As such, the belt assembly and adjustment mechanism and the tension apparatus 270 should not be construed to depend on one another and should not be limited to applications including temperature control systems as described herein.

What is claimed is:

1. A belt assembly and adjustment mechanism for a belt drive system including a belt, the belt assembly and adjustment mechanism comprising:
    a first bracket attachable to a first portion of the belt drive system;
    a second bracket attachable to a second portion of the belt drive system, the second portion different from the first portion; and
    a belt drive system component positioned between the first bracket and the second bracket, the component pivotally coupled to the first bracket on one side of the component and pivotally coupled to the second bracket on another side of the component, the component further slidably coupled to one of the first bracket and the second bracket such that the component is movable between a first orientation at which the belt is configured to be tensioned and a second orientation at which the belt is configured to be installed onto the component.

2. The belt assembly and adjustment mechanism of claim 1, wherein the component is one of an alternator and a generator.

3. The belt assembly and adjustment mechanism of claim 1, wherein when the component is in the second orientation, the belt is configured to be installed onto the component without tension.

4. The belt assembly and adjustment mechanism of claim 1, wherein the second bracket includes an elongated slot, and wherein the component is slidably coupled to the second bracket within the slot.

5. The belt assembly and adjustment mechanism of claim 1, wherein the component includes a first pivot located adjacent the first bracket and a second pivot located adjacent the second bracket, wherein a plane extends through the first pivot and the second pivot and is disposed at a first angle relative to a horizontal plane extending through a center of the component when the component is in the first orientation, and wherein the plane is disposed at a second angle larger than the first angle relative to the horizontal plane when the component is in the second orientation.

6. A belt assembly and adjustment mechanism for a belt drive system including a belt, the belt assembly and adjustment mechanism comprising:
    a first bracket attachable to a portion of the belt drive system and including a first slot;
    a second bracket attachable to a portion of the belt drive system, the second bracket defining a sliding attachment portion including a second slot;
    a link pivotally coupled to the first bracket within the first slot; and
    a belt drive system component pivotally coupled to the link such that the component is guidable through a rotating trajectory via pivotal movement of the link within the first slot, the component coupled to the second bracket within the second slot such that the component is slidable along a linear trajectory within the second slot, the rotating trajectory and the linear trajectory facilitating movement of the component between a first orientation and a second orientation.

7. The belt assembly and adjustment mechanism of claim 6, wherein the component is one of an alternator and a generator.

8. The belt assembly and adjustment mechanism of claim 6, wherein when the component is in the second orientation, the belt is configured to be installed onto the component without tension.

9. The belt assembly and adjustment mechanism of claim 6, wherein the component is further pivotally coupled to the second bracket.

10. The belt assembly and adjustment mechanism of claim 6, wherein the component includes a first pivot located adjacent the link and a second pivot located adjacent the second bracket, and wherein a plane extending through the first pivot and the second pivot is disposed at a first angle relative to a horizontal plane extending through a center of the component when the component is in the first orientation, and the plane is disposed at a second angle larger than the first angle relative to the horizontal plane when the component is in the second orientation.

11. The belt assembly and adjustment mechanism of claim 6, wherein the component is positioned between the first bracket and the second bracket such that the first bracket and the second bracket are on substantially opposite sides of the component.

12. The belt assembly and adjustment mechanism of claim 6, wherein the component is pivotally coupled to the first bracket via the link, and wherein the component is pivotally coupled to the second bracket via a third bracket.

13. A belt assembly and adjustment mechanism for a belt drive system including a belt, the belt assembly and adjustment mechanism comprising:
- a first bracket attachable to a first portion of the belt drive system;
- a second bracket attachable to a second portion of the belt drive system, the second portion different from the first portion; and
- a belt drive system component positioned between the first bracket and the second bracket such that the first bracket and the second bracket are on substantially opposite sides of the component, the component including a first pivot located adjacent the first bracket and a second pivot located adjacent the second bracket, the component further slidably coupled to one of the first bracket and the second bracket such that the component has a rotating trajectory and a sliding trajectory between a first orientation and a second orientation,
- wherein a plane extending through the first pivot and the second pivot is disposed at a first angle relative to a horizontal plane extending through a center of the component when the component is in the first orientation, and
- wherein the plane is disposed at a second angle larger than the first angle relative to the horizontal plane when the component is in the second orientation.

14. The belt assembly and adjustment mechanism of claim 13, wherein the component is one of an alternator and a generator.

15. The belt assembly and adjustment mechanism of claim 13, wherein the first orientation corresponds to a belt tensioning position and the second orientation corresponds to a belt installation position at which the belt is configured to be installed onto the component.

16. The belt assembly and adjustment mechanism of claim 13, wherein the first bracket includes a first slot and the second bracket includes a second slot, the belt assembly and adjustment mechanism further comprising a link pivotally coupled to the first bracket within the first slot, and wherein the component is pivotally coupled to the first bracket via the link.

17. The belt assembly and adjustment mechanism of claim 16, wherein the component is pivotally coupled to the second bracket via a third bracket.

18. The belt assembly and adjustment mechanism of claim 16, wherein the component is pivotal relative to the second bracket and slidably movable relative to the second bracket within the second slot.

19. The belt assembly and adjustment mechanism of claim 18, wherein the rotating trajectory corresponds to pivotal movement of the component about at least one of the first bracket and the second bracket, and the linear trajectory corresponds to sliding movement of the component with in the second slot.

* * * * *